Patented May 13, 1930

1,758,324

UNITED STATES PATENT OFFICE

ERWIN KRAMER, OF COLOGNE-DEUTZ, LUDWIG ZEH, OF WIESDORF-ON-THE-RHINE, AND BERNHARD BOLLWEG, OF LEVERKUSEN-ON-THE-RHINE, GERMANY, ASSIGNORS TO GENERAL ANILINE WORKS, INC., OF NEW YORK, N. Y., A CORPORATION OF DELAWARE

SULPHUR DYESTUFFS

No Drawing. Application filed June 13, 1928, Serial No. 285,201, and in Germany June 30, 1927.

The present invention relates to new sulphur dyestuffs obtainable from binaphthylendioxide

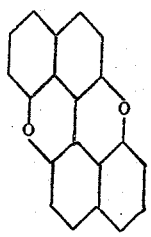

by sulphurization.

We have found that when reacting upon binaphthylendioxide, the preparation of which is described in Berichte der deutschen chemischen Gesellschaft Vol. 50, page 2159, at elevated temperature with suitable sulphurating agents, such as sulphur, sulphur halogenides and mixtures of sulphur with sulphur halogenides, valuable sulphur dyestuffs are obtainable which dye cotton from a sodium sulphide vat clear yellowish brown to violet brown shades of goods fastness properties, whereby the temperatures to be used during the sulphurization, vary according to the kind of sulphurating agent used and the desired shades of the dyestuffs to be obtained. For instance, binaphthylendioxide may be heated with sulphur at temperatures between about 240–300° C. for about 4–8 hours. The amount of sulphur to be used in this process varies in wide limits, about three parts by weight upon one part by weight of binaphthylendioxide being mentioned by way of example. When working at the lower ranges of the temperatures above mentioned, the shades of the dyestuffs on cotton are yellowish brown to brown, whereas the dyestuffs obtained at the higher temperatures dye cotton more violet brown shades. When working with a sulphur halogenide as sulphurating agent, the method may be as follows: Binaphthylendioxide is heated with a sulphur halogenide, such as sulphur chloride, ($S_2Cl_2$) or sulphur dichloride ($SCl_2$). Even at lower temperatures, i. e. at about 10–150° C. reaction takes place with the formation of an intermediate product which is converted into the dyestuff by heating the melt to higher temperatures, f. i. to about 220–260° C. In many cases it will be advantageous to add sulphur to the reaction mixture either at the beginning, or after the formation of the intermediate product is complete. Also it is possible to add to the melt an inert high boiling organic solvent such as nitro-benzene o-dichlorobenzene, tri-chlorobenzene e. a. and in this case the formation of the dyestuffs may be accomplished by boiling the reaction mixture for a prolonged time f. i. for about 6–20 hours. Also in these cases the amounts of the sulphur halogenide and the sulphur to be employed may vary in wide limits, about 2–4 parts by weight upon one part by weight of binaphthylendioxide being mentioned by way of example. When working without the addition of an organic solvent and at temperatures of about 220–260° C. the formation of the dyestuffs will be complete in a rather short time, mainly depending upon the temperature used and will range in the most cases between about ½ and 3 hours. For purifying the dyestuffs they may be redissolved from an aqueous sodium sulfide solution.

The dyestuffs thus obtainable form dark powders, very difficulty soluble in strong sulphuric acid and the usual organic solvents, easily soluble in aqueous sodium sulfide solution with orange red to red colorations, from which solutions cotton is dyed clear yellowish brown to violet brown shades of good fastness properties.

The following examples illustrate our invention, without limiting it thereto:

*Example 1.*—28.2 parts by weight of binaphthalendioxide are heated with 90 parts by weight of sulphur for several hours at from 240–280° C. The powdered melt is dissolved in an aqueous sodium sulfide solution, filtered and the dyestuff is separated in the customary manner. A reddish brown to violet brown powder is obtained, which is readily soluble in an aqueous sodium sulfide solution with an orange red coloration dyeing cotton from this solution a like shade, which on exposure to air changes to reddish brown.

*Example 2.*—20 parts by weight of binaphthalendioxide are stirred into 46 parts by weight of sulphur monochloride, part of the same dissolving with the evolution of hydrogen chloride. On heating to 80–120° C. the reaction mixture solidifies to an orange yellow mass, which is then further heated for several hours to 220–240° C. until the formation of the dyestuff is complete. The dyestuff is purified by re-dissolving from an aqueous sodium sulfide solution. The reddish- to violet-brown powder thus obtained dissolves in water with sodium sulfide with a red coloration, dyes cotton the same shade and after exposure to air a powerful violet-brown.

*Example 3.*—15 parts by weight of binaphthalendioxide are introduced into a mixture of 100 parts by weight of nitrobenzene and 35 parts by weight of sulphur monochloride. The reaction begins at once with the evolution of hydrogen chloride. The mixture is then heated in the course of three hours to the boiling point of the nitrobenzene, whereupon an orange yellow substance separates temporarily, which re-dissolves on further boiling the mixture and again separates after prolonged boiling in the form of a dark substance. This is filtered while cold, washed with benzene and dried. The dyestuff possesses properties, similar to those of the product obtained in Example 2.

*Example 4.*—15 parts by weight of binaphthalendioxide are entered into 70 parts by weight of sulphur dichloride ($SCl_2$), when on heating a vigorous reaction begins. When this reaction has ceased, 35 parts by weight of sulphur are added and the heating is then continued for several hours at from 250–280° C. until the formation of the dyestuff is complete, which shows similar properties as that described in Example 2.

*Example 5.*—15 parts by weight of binaphthalendioxide are introduced at 60–80° C. into a mixture of 46 parts by weight of sulphur monochloride and 35 parts by weight of sulphur. The temperature is maintained at 80–120° C. until the end of the first reaction, then slowly raised to 250–260° C. and maintained at this temperature until the formation of the dyestuff is complete. A dyestuff is obtained similar to that produced in Example 2.

We claim:

1. Process, which comprises sulphurating binaphthylendioxide by reacting upon the same with sulphur monochloride at a temperature of about 220–240° C.

2. Sulphur dyestuffs being obtainable by sulphurating binaphthylendioxide, said dyestuffs being dark powders, very difficultly soluble in the usual organic solvents and in strong sulphuric acid, easily soluble in aqueous sodium sulfide solution with orange red to red colorations from which solutions cotton is dyed clear yellowish brown to violet brown shades of good fastness properties.

3. The sulphur dyestuff being obtainable by reacting upon binaphthylendioxide with sulphur monochloride at a temperature of about 220–240° C., said dyestuff being a reddish brown to violet-brown powder, soluble in aqueous sodium sulfide solution with a red coloration, from which solution cotton is dyed a powerful violet brown shade.

4. The process which comprises reacting upon binaphthylendioxide with a sulphurating agent at a temperature between about 170 and 300° C.

In testimony whereof we have hereunto set our hands.

ERWIN KRAMER. [L. S.].
LUDWIG ZEH. [L. S.].
BERNHARD BOLLWEG. [L. S.].